United States Patent
Nabuurs et al.

(10) Patent No.: US 8,991,911 B2
(45) Date of Patent: Mar. 31, 2015

(54) OPEN ROOF CONSTRUCTION FOR A VEHICLE

(71) Applicant: Inalfa Roof Systems Group B.V., Venray (NL)

(72) Inventors: Martinus Wilhemus Maria Nabuurs, Overloon (NL); Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/067,590

(22) Filed: Oct. 30, 2013

(65) Prior Publication Data
US 2014/0175840 A1  Jun. 26, 2014

(30) Foreign Application Priority Data
Oct. 30, 2012  (EP) .................................... 12190655

(51) Int. Cl.
| | |
|---|---|
| *B60J 7/047* | (2006.01) |
| *B60J 7/057* | (2006.01) |
| *B60J 7/053* | (2006.01) |
| *B60J 7/02* | (2006.01) |
| *B60J 7/043* | (2006.01) |

(52) U.S. Cl.
CPC .................. *B60J 7/053* (2013.01); *B60J 7/024* (2013.01); *B60J 7/0435* (2013.01)
USPC ................... 296/216.03; 296/216.05; 296/223

(58) Field of Classification Search
CPC .......... B60J 7/047; B60J 7/057; B60J 7/0435; B60J 7/024
USPC .................... 296/216.02–216.05, 220.01, 223
See application file for complete search history.

(56) References Cited

U.S. PATENT DOCUMENTS

| | | | |
|---|---|---|---|
| 4,911,497 A | 3/1990 | Schreiter | |
| 6,129,413 A | 10/2000 | Klein | |

(Continued)

FOREIGN PATENT DOCUMENTS

| | | |
|---|---|---|
| DE | 19851366 | 5/1999 |
| EP | 0331910 | 2/1989 |

(Continued)

OTHER PUBLICATIONS

Official Search Report of the European Patent Office in related foreign application No. EP 11195333 filed Dec. 22, 2011.

*Primary Examiner* — Dennis H Pedder
(74) *Attorney, Agent, or Firm* — Steven M. KoehleR; Westman, Champlin & Koehler, P.A.

(57) ABSTRACT

A vehicle open roof construction includes a closure element movably supported and adjusted by a driving slide. A front longitudinal guide track extends along a roof opening, whereas a rear longitudinal guide track is mounted at least substantially rearward of the roof opening. A front support which is movably guided by said front longitudinal guide track supports the closure element, while a rear support also supports the closure element and includes a lifting device and a guiding device for engagement in said rear longitudinal track upon rearward movement of the closure element. The lifting device and the guiding device are integrated as a rotatable element. A forcing mechanism determines whether the rotatable element acts either as the lifting device or the guiding device. The rotatable element is adjustable in vertical direction with respect to and independently of the rear guide track when the movable element acts as the lifting device.

16 Claims, 16 Drawing Sheets

(56) References Cited

U.S. PATENT DOCUMENTS

| | | | | |
|---|---|---|---|---|
| 6,158,803 | A | * | 12/2000 | Reihl et al. ............... 296/216.04 |
| 6,390,545 | B1 | | 5/2002 | Makino et al. |
| 6,527,337 | B2 | | 3/2003 | Farber |
| 6,568,750 | B2 | * | 5/2003 | Radmanic et al. ....... 296/216.03 |
| 6,652,022 | B2 | * | 11/2003 | Pfalzgraf et al. ......... 296/220.01 |
| 6,942,285 | B2 | * | 9/2005 | Manders et al. ......... 296/216.03 |
| 8,136,872 | B2 | | 3/2012 | Nellen |
| 2005/0218704 | A1 | | 10/2005 | Uehara |
| 2009/0039682 | A1 | | 2/2009 | Ito |
| 2009/0072589 | A1 | | 3/2009 | Ito |
| 2013/0161983 | A1 | | 6/2013 | Geurts |

FOREIGN PATENT DOCUMENTS

| | | |
|---|---|---|
| EP | 1741588 | 7/2005 |
| EP | 1314600 | 5/2007 |
| EP | 2028031 | 3/2012 |
| JP | 59156820 | 9/1984 |
| WO | 2009109219 | 9/2009 |

* cited by examiner

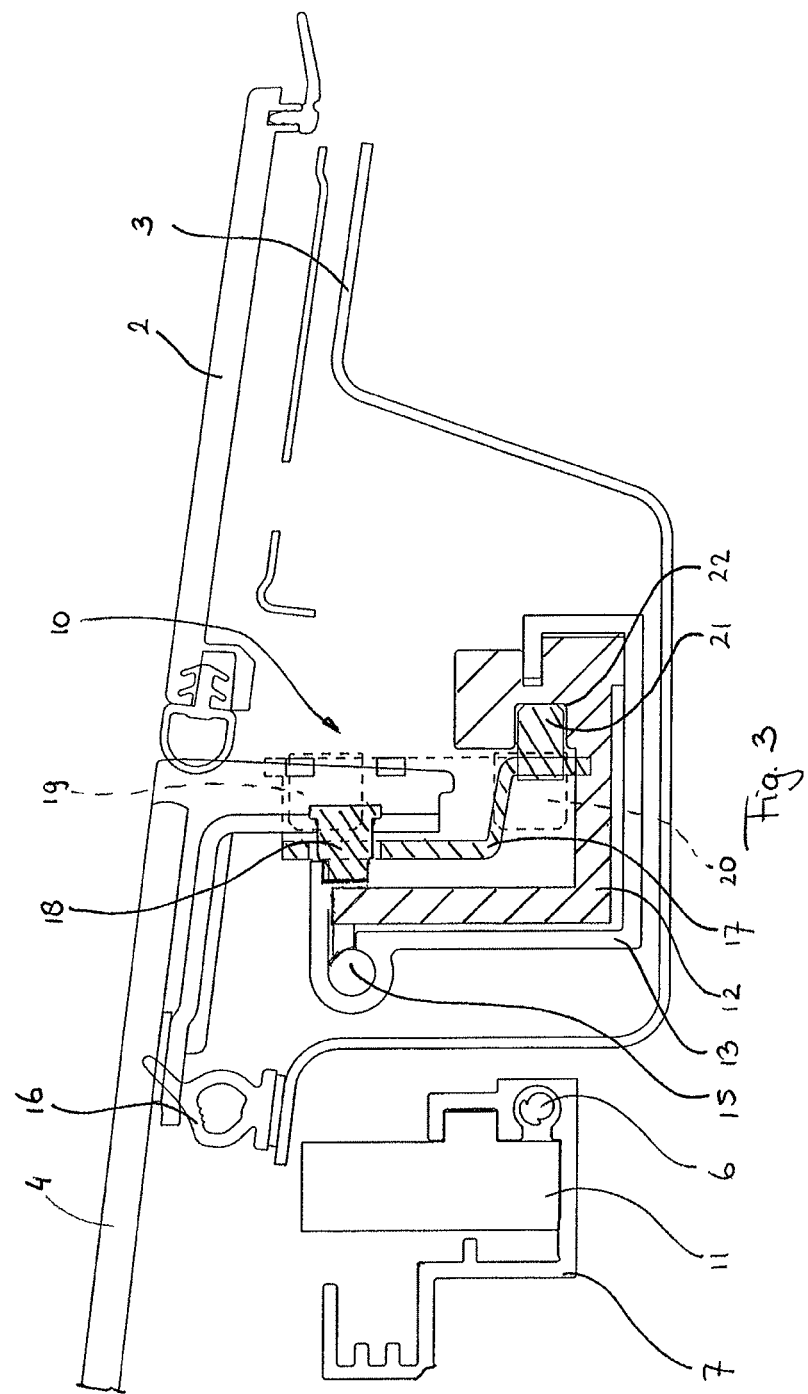

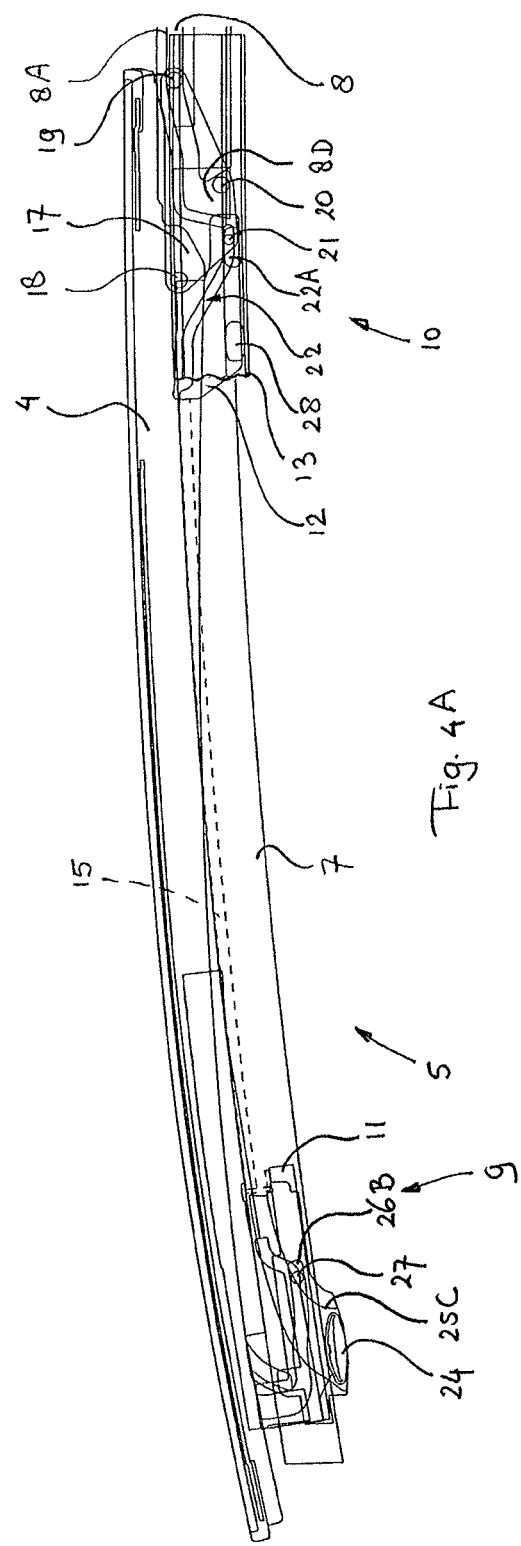

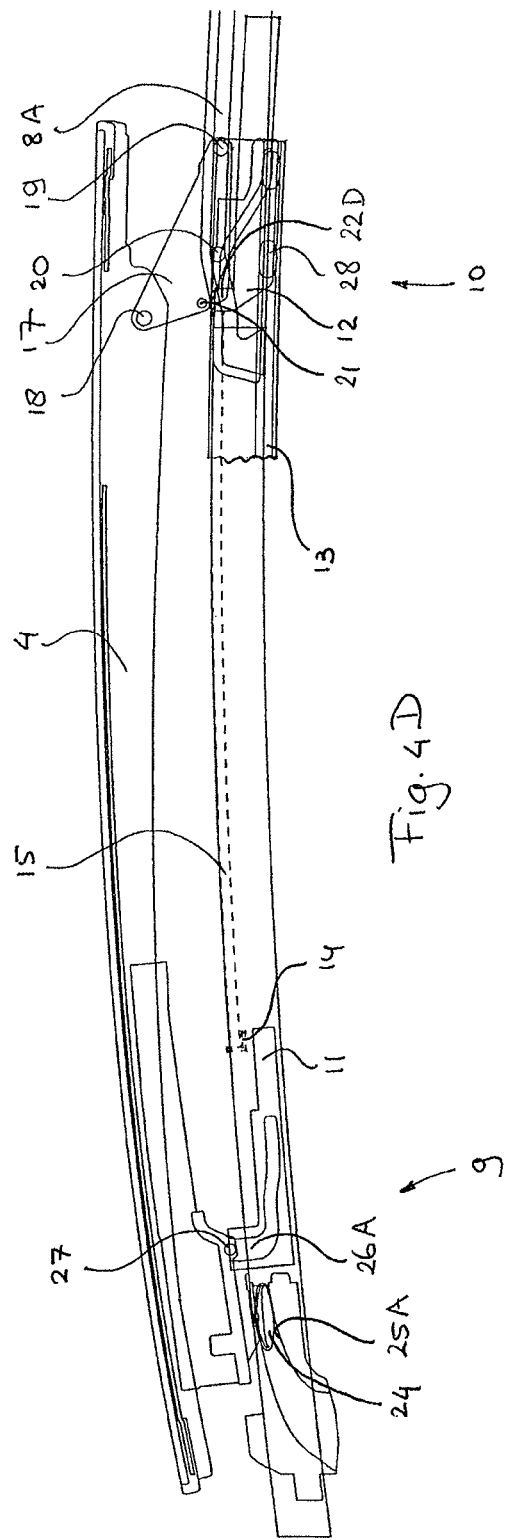

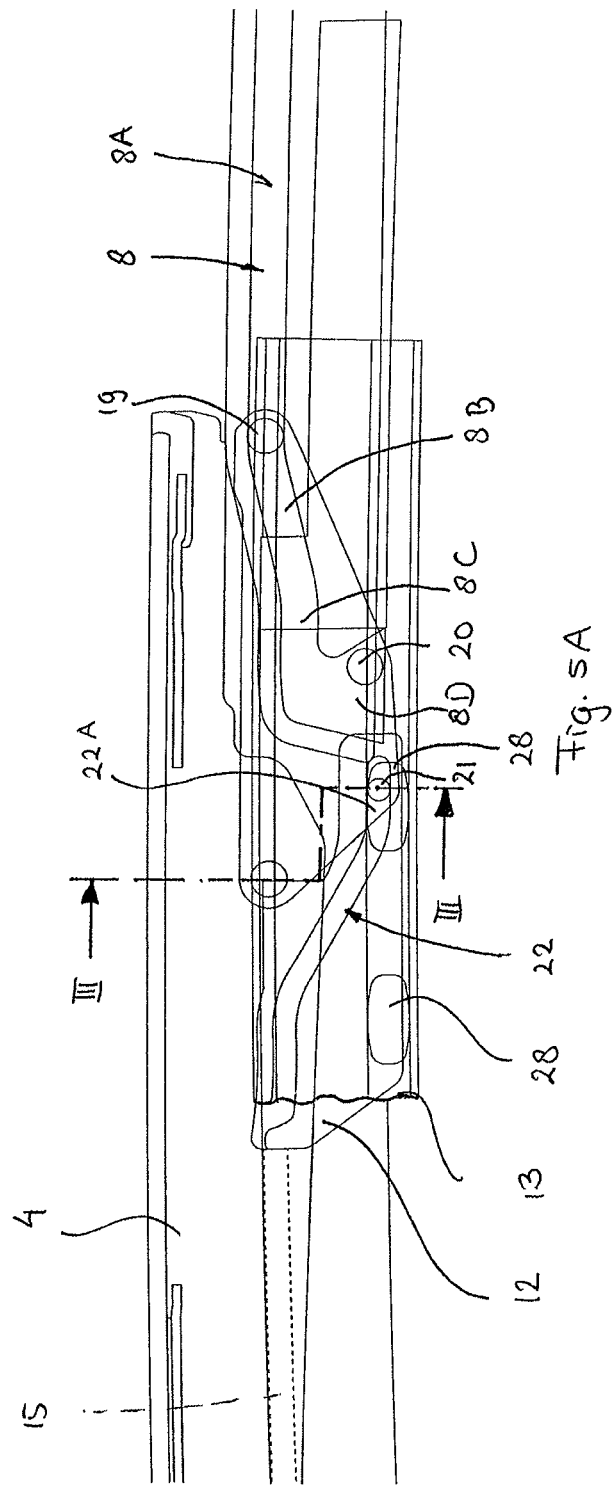

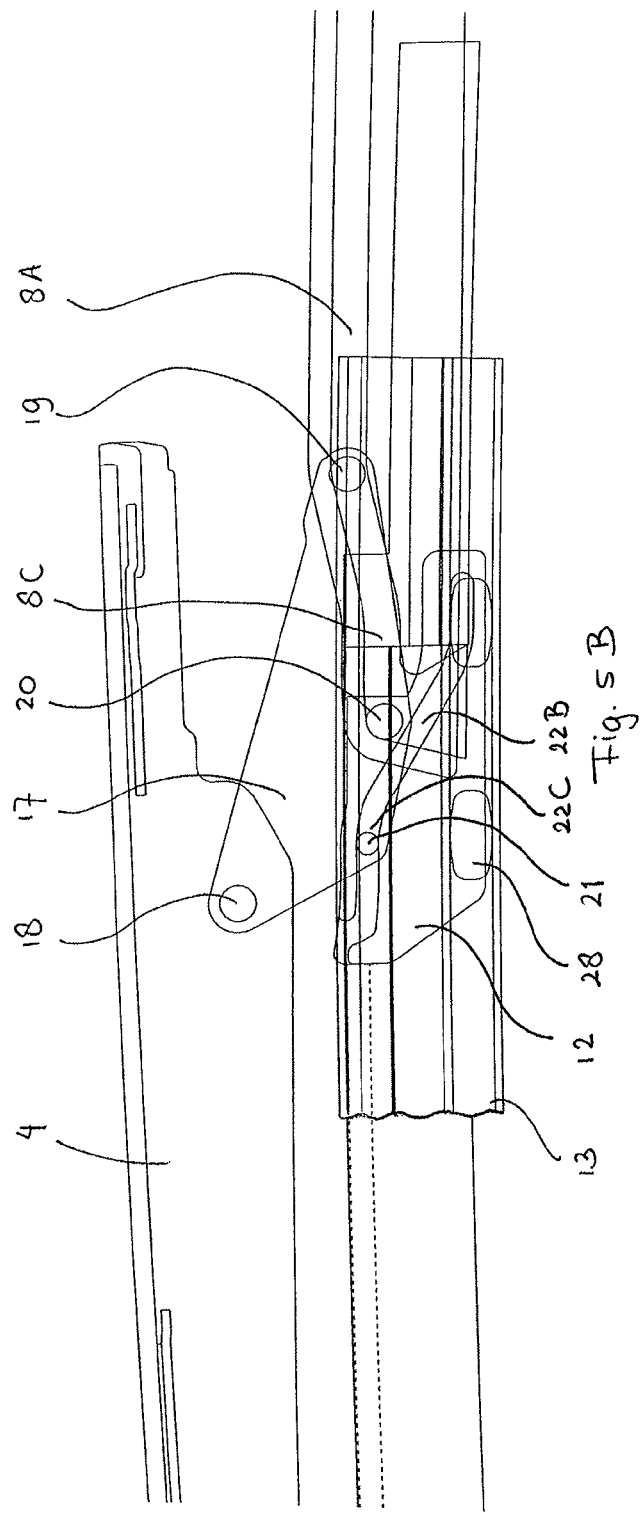

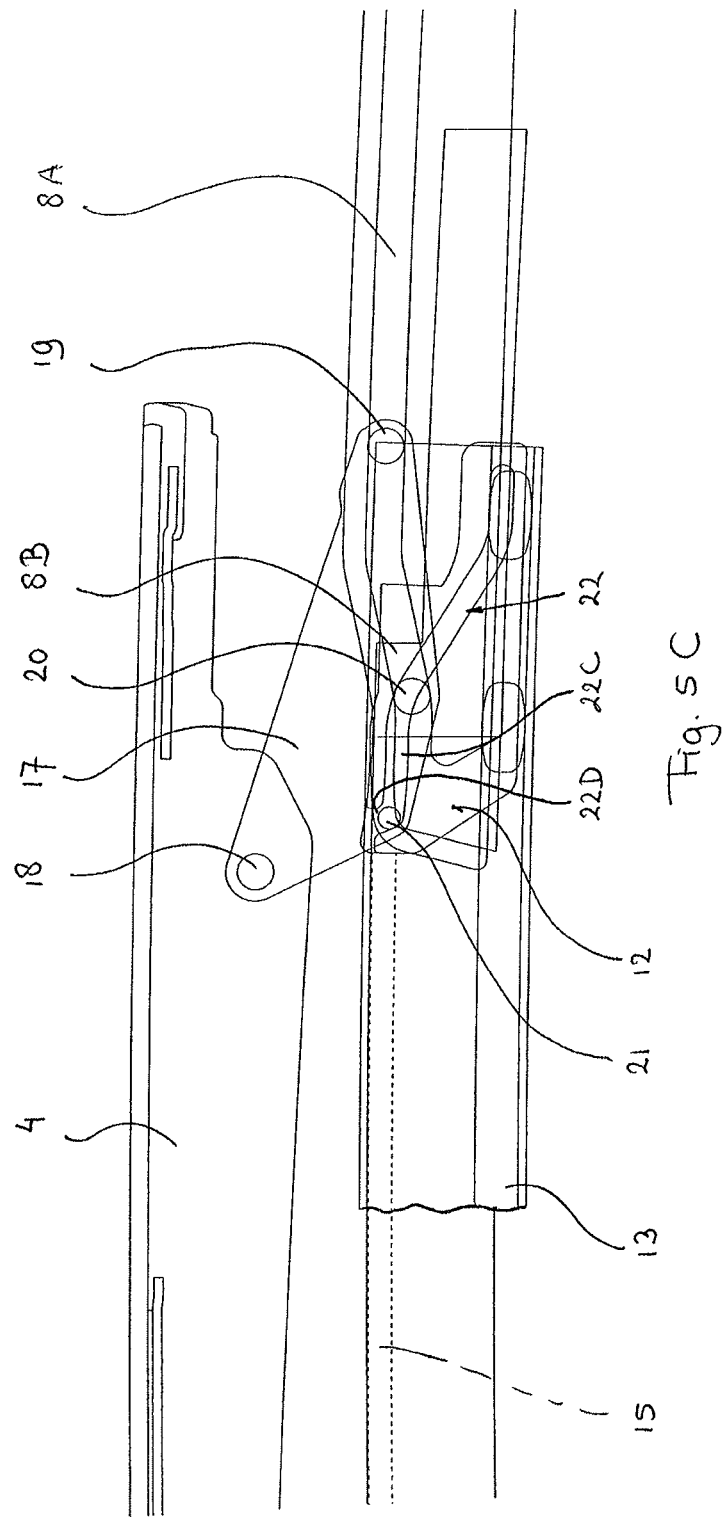

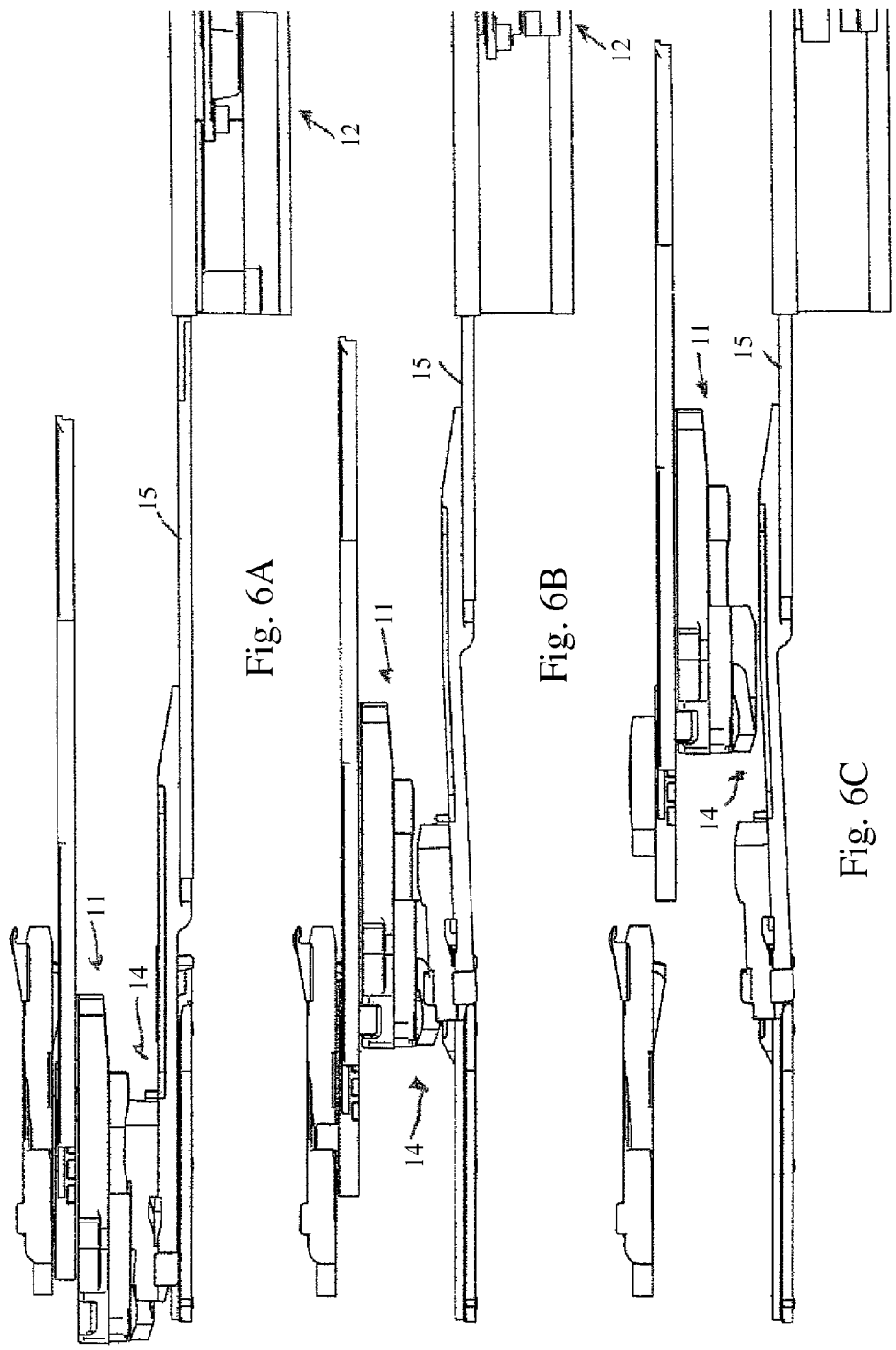

OPEN ROOF CONSTRUCTION FOR A VEHICLE

BACKGROUND

The discussion below is merely provided for general background information and is not intended to be used as an aid in determining the scope of the claimed subject matter.

In a known an open roof construction a guide curve in a guiding slide is vertical. A guide member of a rotatable element engages the vertical guide curve while it also engages a forcing guide of a rear longitudinal guide track. A rear movement of the guiding slide from the closed position of the panel forces the guide member to move through the guide curve and through the forcing guide to effect a pivoting movement of the rotatable element to move the panel to an inclined venting position. A further rearward movement of the guiding slide effects a sliding movement of the panel as the guide member and another guide member move through the rear longitudinal guide track.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention is to provide a novel, simple and robust open roof construction.

According to one aspect of the invention the movable element is adjustable in a vertical direction with respect to and independently of the rear longitudinal guide track when the movable element is active as a lifting device, the guide curve of the guiding slide being at least partly inclined thus extending in vertical and longitudinal direction so as to move the movable element in vertical direction upon a relative longitudinal movement between the guiding slide and the movable element during which the guide member of the movable element is moved along the guide curve.

Now that the lifting movement of the rear side of the closure element is determined by the extent of the guide curve in the guiding slide, independent of the rear longitudinal guide track or a forcing guide thereof, there is more freedom for obtaining a desired movement of the closure element during lifting, and also for choosing the length of travel of the guiding slide during lifting of the closure element.

The movable element may be a rotatable element which substantially rotates when it acts as the lifting device and substantially slides when it acts as the guiding device, the forcing mechanism determining the transition between both movements.

In an embodiment, the guide curve of the guiding slide has an open end to enable the guide member of the movable element to leave the guide curve to enable the movable element to act as the guiding device, the open end of the guide curve may be at the front end thereof, so that the guiding slide moves rearwardly to move the closure element from the closed position to the open, rearward position. The guiding slide may be substantially stationary when the movable element acts as a guiding device, the closure element being moved by the driving slide through the front support when the movable element acts as the guiding device.

In this manner, a very simple drive is obtained as the guiding slide is moved rearwardly for lifting the closure element from the closed position. Then the guide member may leave the guide curve in the guiding slide to enable the movable element to continue as the guiding device, while leaving the guiding slide behind, so that the maximum travel of the guiding slide is small and does not have to extend as far back as the rear guide track.

The front support may be connected to the closure element such that the front support keeps the closure element substantially stationary in the longitudinal direction of the guide tracks when the movable element acts as the lifting device so as to enable the guiding slide to move relative to the movable element.

In this manner, the longitudinal movement of the closure element is controlled by the front support, to enable the guiding slide to move with respect to the closure element—and the movable element connected thereto—to control the lifting movement of the closure element.

The driving slide may be selectively connectable to the guiding slide through a coupling/locking element, locking the guiding slide to the stationary part if the coupling element between the driving slide and the guiding slide is uncoupled to disconnect the driving slide from the guiding slide.

The coupling element and the locking element effect a reliable operation of the guiding slide, without needing to drive it directly.

The movable element may have a first support member continuously in engagement with the rear longitudinal guide track, and a second support member which is in engagement with and supported by the rear longitudinal guide track when the movable element acts as the guiding device and is unsupported with respect to the rear longitudinal guide track when the movable element acts as the lifting device. This is a simple manner of allowing the movable element to act as a guiding device on the one hand and to act as a lifting device substantially independently of the rear guide track on the other hand.

The front longitudinal guide track and the rear longitudinal guide track are separated from each other by a barrier carrying a seal engaged by the closure element in its closed position, the driving slide being guided in the front longitudinal guide track and the guiding slide being guided in an intermediate longitudinal guide track positioned near the front end of the rear longitudinal guide track, the driving slide and the guiding slide being connected to each other through a transmission element guided through the barrier.

In this manner, the guiding slide may be positioned in the wet area of the roof, while the driving slide is positioned in the dry area, and still be driven by the driving slide.

The pivot pin and first and second support members are positioned at the corners of a triangle, the guide member being in one embodiment positioned outside the triangle and/or positioned closer to the second support member than to the pivot pin or first support member.

This allows a stable support of the closure element by the movable element, while also being able to obtain a leverage effect.

BRIEF DESCRIPTION OF THE DRAWINGS

Further details and advantages of aspects of the invention follow from the below description with reference to the drawings schematically showing an embodiment of the invention by way of example.

FIG. 3 is an enlarged cross sectional view according to the line III-III in FIG. 5A, wherein, however, the driving slide has been shown in its rear position.

FIGS. 4A-4E are side views of a panel of the open roof construction of FIG. 1 and an adjusting mechanism supporting it, in four different positions.

FIGS. 5A-5D are enlarged side views of the rear support of the adjusting mechanism of FIGS. 4A-4D.

FIGS. 6A-6C are top plan views of the adjusting mechanism in three different positions.

DETAILED DESCRIPTION OF THE ILLUSTRATIVE EMBODIMENTS

Figure 1:
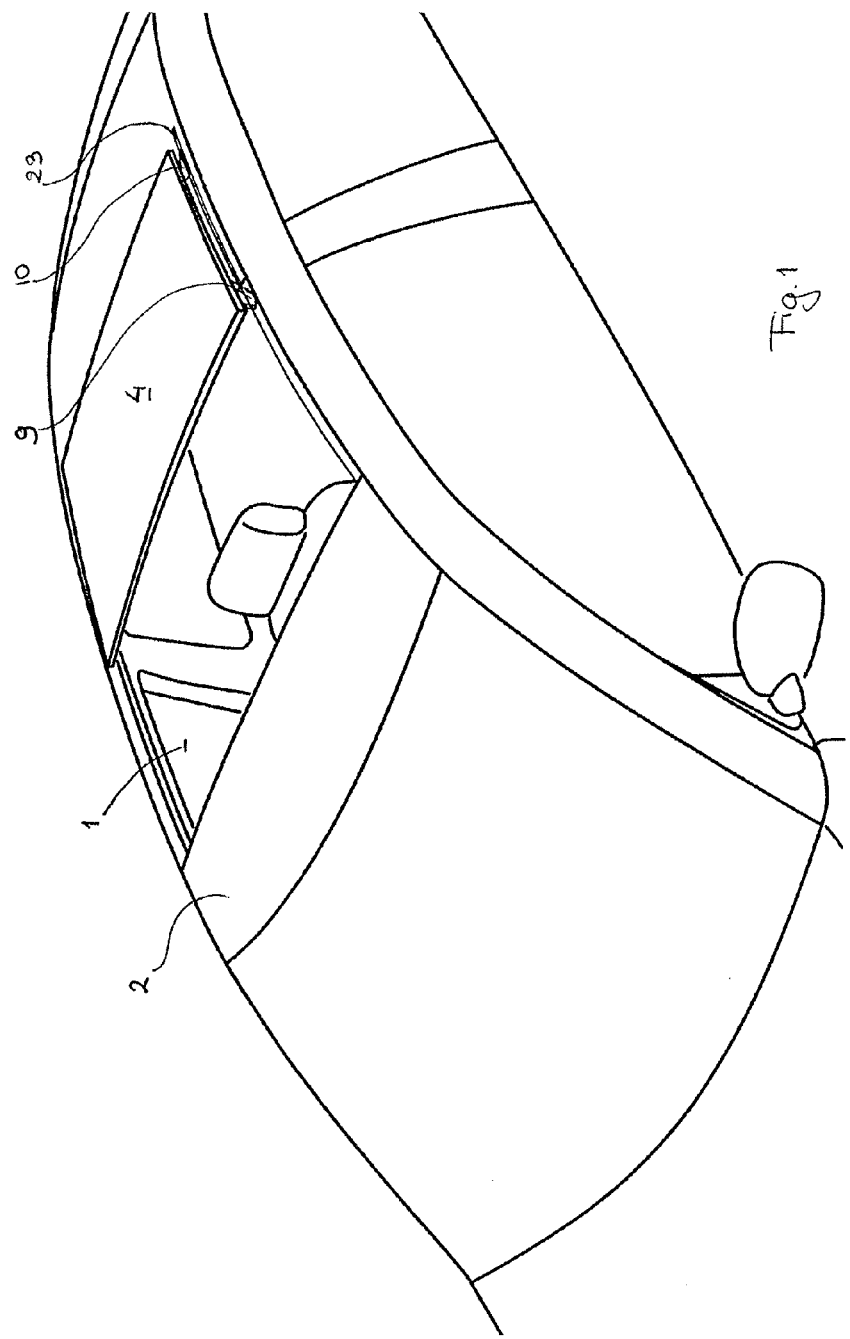
FIG. 1 is a perspective view of a part of a vehicle equipped with the embodiment of the open roof construction.

The drawings show an embodiment of an open roof construction for a vehicle, in particular a motor vehicle such as a passenger car. As is shown in FIG. 1, this vehicle is provided with an opening 1 in its fixed roof 2, whereby it is noted that said fixed roof 2 may either form part of the vehicle or of the open roof construction itself, which in that case makes up the entire roof of the vehicle. The fixed roof 2 may consist of an integral part of the vehicle or of one or more (transparent) panels, which may be removable or form a separate adjustable roof element.

Figure 2:
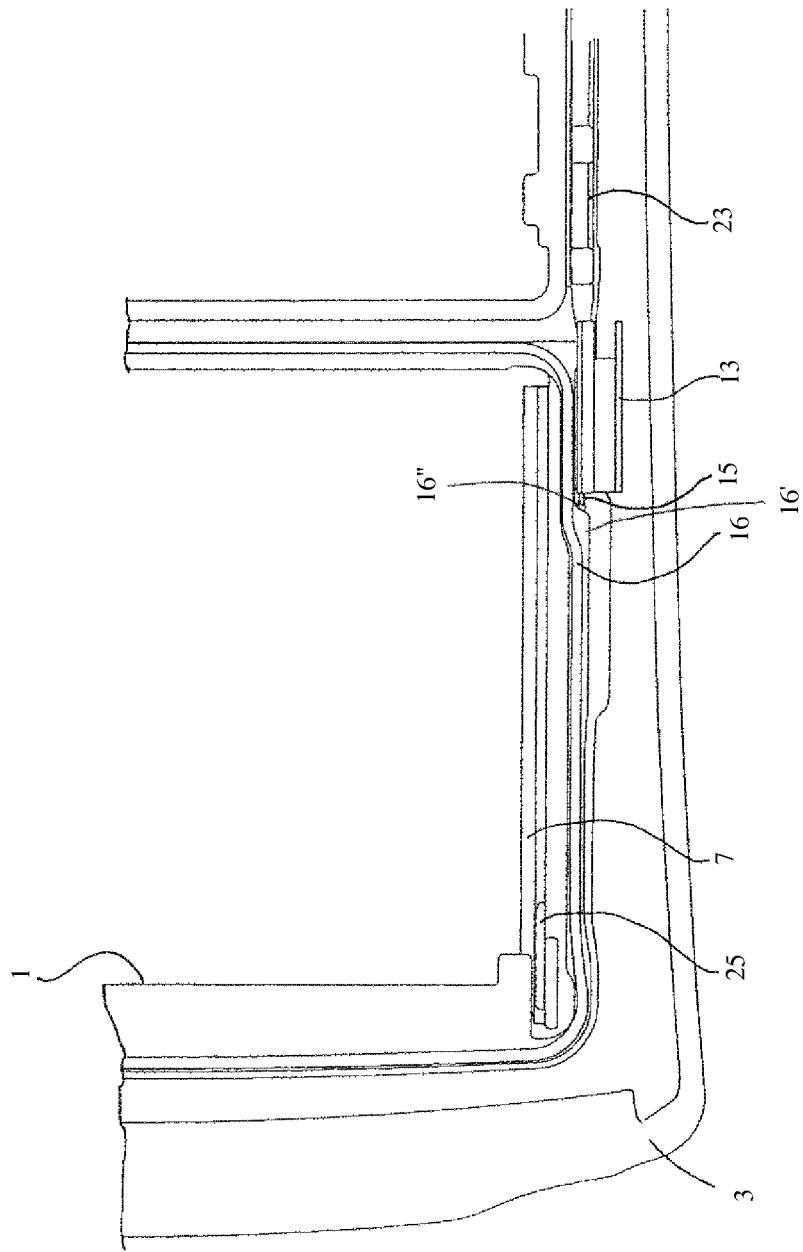
FIG. 2 is an enlarged front left plan view of the frame of the open roof construction of FIG. 1.

The open roof construction comprises a stationary part, such as a frame 3 (FIG. 2), and a closure element, in this case in the form of a rigid and in one embodiment transparent panel 4, for example made of glass or of plastic material, which is movably supported by frame 3. In this embodiment, panel 4 is movable between a closed position, in which roof opening 1 is closed and panel 4 is at least substantially coplanar with the fixed roof 2, and an open position, in which panel 4 occupies a rearward position, at least partially above fixed roof 2, in which a very large part of opening 2 is cleared.

An adjusting mechanism 5 is provided on each longitudinal side of panel 4 for effecting the movements of panel 4. The mechanism 5 is driven by a driving unit including a driving element, such as a driving cable 6 (FIG. 3) and a manual actuator, such as a crank, or a motor such as an electric motor, for driving the cable (not shown). The mechanism 5 supports panel 4 and is at least partially guided in a front longitudinal guide track 7, which forms part of or is mounted on frame 3. The front longitudinal guide track 7 extends along the side edge of roof opening 1, at a lower level than fixed roof 2. Furthermore, a rear longitudinal guide track 8 is provided, namely at the fixed roof, substantially rearward of the roof opening 1 and in this case at a higher level than front longitudinal guide track 7.

The adjusting mechanism 5 for panel 4 includes a front support 9 and a rear support 10. The front support 9 is in engagement with a driving slide 11 which is guided in front longitudinal guide track 7 and forms part of the driving unit of adjusting mechanism 5. The driving cable 6 is fixed to driving slide 11. For the rear support 10 of adjusting mechanism 5, there is provided a guiding slide 12 guided through slide shoes 28 (FIG. 4A, 5A) in an intermediate guide track 13 positioned near the front of rear guide track 8. The guiding slide 12 is selectively connectable and drivable by driving slide 11 through a coupling element 14, also acting as a locking element locking the guiding slide 12 to the stationary part if the coupling element 14 between driving slide 11 and guiding slide 12 is uncoupled to disconnect driving slide 11 from guiding slide 12. The coupling/locking element (which may also be two separate elements) is shown in more detail in FIGS. 6A-6C and 7A-7C, but is also described in US Published Patent Application US2013/0161983, which is hereby incorporated by reference in its entirety. Some of the components of the coupling element in the prior publication include a locking lever 8, cams 9,10, a locking spring member 13 and a locking tab 15.

The coupling element 14 of driving slide 11 cooperates with an elongated transmission element 15, for example a push-pull cable or rod, capable of transmitting a compression or pushing force. It is fixed to guiding slide 12 and extends mainly forwardly thereof. The rear 8 and intermediate guide tracks 8,13 are positioned in the wet area of the roof, i.e. outside a seal 16 engaging panel 4 in its closed position to seal the roof. The front guide track 7 extends inside seal 16 so that the elongated transmission element 15 should pass the seal 16 to form a connection between driving slide 11 in front guide track 7 and guiding slide 12 in intermediate guide track 13. For this purpose the transmission element 15 is guided through a barrier 16' below seal 16 in a sealed manner, for example through an O-ring seal 16" or the like.

As is shown in FIGS. 4 and 5, rear support 10 comprises a movable, in particular rotatable element 17, which is partially rotatable, which can act both as lifting device and a guiding device for moving the rear side of panel 4 in vertical direction and for guiding panel 4 at its rear-side during a sliding movement thereof above fixed roof 2 of the vehicle. The movable or rotatable element 17 has four members, such as pins: a pivot pin 18 being connected, for example pivotally connected, to panel 4, a first support member 19 engaging permanently in rear longitudinal guide track 8, a second support member 20 engaging in rear longitudinal guide track 8 during a sliding movement of panel 4 and a guide member 21 engaging in a guide curve 22 of guiding slide 12 of the forcing mechanism during a pivoting movement of panel 4. The pivot pin 18 is positioned more to the front than first support member 19, so that element 17 extends from first support member 19 in forward direction. The pivot pin 18 and the support members 19, 20 are arranged in a triangular position with respect to each other, whereas guide member 21 is positioned just outside the triangle closest to second support member 20. The guide member 21 and the second support member 20 could be integrated.

The forcing mechanism in the form of guide curve 22 determines whether the rotatable element 17 acts as the lifting device or as the guiding device so as to impose a height-adjustment to the panel 4 or a sliding motion. The guide curve 22 in the guiding slide 12 is in this case a slot in which the guide member 21, here a pin, of rotatable element 17 engages. Curve 22 is at least partly inclined and extends in longitudinal and vertical direction. In this embodiment, it has a rear section 22A extending in a longitudinal direction substantially parallel to intermediate guide track 13, an intermediate, inclined section 22B extending forwardly and upwardly, a front section 22C substantially parallel to rear section 22A, and an outlet section 22D at the open front end of guide curve 22 extending mainly upwardly. Other curve shapes are very well conceivable depending on the desired movement of the panel 4.

In the embodiment as shown, rear longitudinal guide track 8 extends mainly parallel to fixed roof 2 to which it is fixed, i.e. in main rear section 8A. The guide track 8 may extend at a lower level than the upper surface of the fixed roof 2, so that it is mainly hidden from view, but higher positions are conceivable as well.

In order to enable rotatable element 17 to move to a position behind roof opening 1, there is created a longitudinal opening 23 extending parallel to rear guide track 8 and allowing passage of rotatable element 17 so that it can extend from panel 4 above fixed roof 2 to the rear guide track lying below fixed roof 2. As a result rotatable element 17 can be in constant engagement with panel 4 and rear guide track 8. A split seal or the like (not shown) in longitudinal opening 23 seals or visually covers the opening but is deformable to allow passage of rotatable element 17.

The rear guide track 8 has near its front end an inclined section 8B, a front section 8C substantially parallel to intermediate guide track 13 and an inlet section 8D extending downwardly from front section 8C. The first support member 19 will remain within main rear section 8A, second support member 20 will travel through all sections, and will be unsupported at least vertically, but here also horizontally, in inlet section 8D when panel 4 is in the closed position.

The front support 9 includes a slide shoe 24 which is attacked to panel 4 and is permanently in engagement with a stationary front curve 25. The front curve 25 has a main section 25A extending substantially parallel to front guide track 7 and fixed roof 2, i.e. mainly following the curve thereof. It also has an inclined or even vertical front section 25C and an intermediate section 25B connecting rear section 25A with front section 25C and is curved for this purpose.

The panel 4 is in engagement with driving slide 11 through a front guide curve 26 therein, which is a slot in this embodiment. For that purpose, panel 4 includes a front engagement member 27, here in a form of a transverse pin. The front guide curve 26 includes a front section 26A which is oriented steeply upwardly, substantially perpendicularly to main section 7A of front guide track 7, and a connected rear section 26B which is substantially parallel to front longitudinal guide track 7 with a slightly inclined portion.

The operation of the open roof construction will be explained with reference to FIGS. 4 and 5.

In FIGS. 4A and 5A, panel 4 is in its closed position. In this position, front engagement member 27 of front support 9 is positioned at the rear end of rear section 26B of front guide curve 26 in driving slide 11. The front slide shoe 24 is positioned near the lower front end of front section 25C of front curve 25. The guide member 21 of rotatable element 17 is positioned at the lower rear end of rear section 22A of guide curve 22 in guiding slide 12 and thus rotatable element 17 is rotated maximally downwardly. The first support member 19 is positioned near the front end of main section 8A of rear guide track 8. The rotatable element 17 extends from this first support member 19 forwardly. The second support member 20 is positioned in inlet 8D at the front end of rear longitudinal guide track 8 and is unsupported, and is thus out of engagement with the supporting sections 8A-8C of guide track 8. The control of the movements of panel 4 is delivered by the engagement of guide member 21 in guide curve 22 in guiding slide 12. The guiding slide 12 is positioned with its front end near the front end of intermediate longitudinal guide track 13.

Figure 4B:
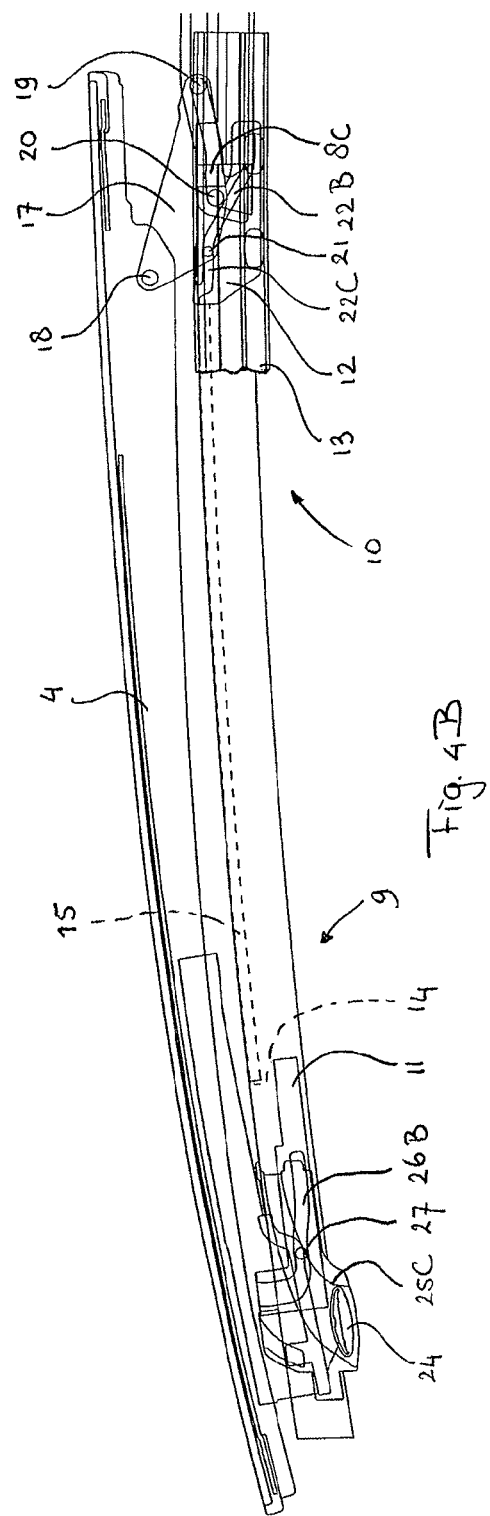

In FIG. 4B, 5B, driving slide 11 has been displaced a small distance rearwardly. The front guide curve 26 moves with respect to front engagement member 27 of front support 9 but due to the fact that rear section 26B of front guide curve 26 extends almost parallel to front longitudinal guide track 7 (and front section 25C at an angle) front engagement member 27 only moves slightly upwardly so that front slide shoe 24 moves only a very small distance upwardly and rearwardly in front section 25C of front curve 25. The direction of crossing curves 25 and 26 determine the movement of the front side of panel 4.

Figure 4C:
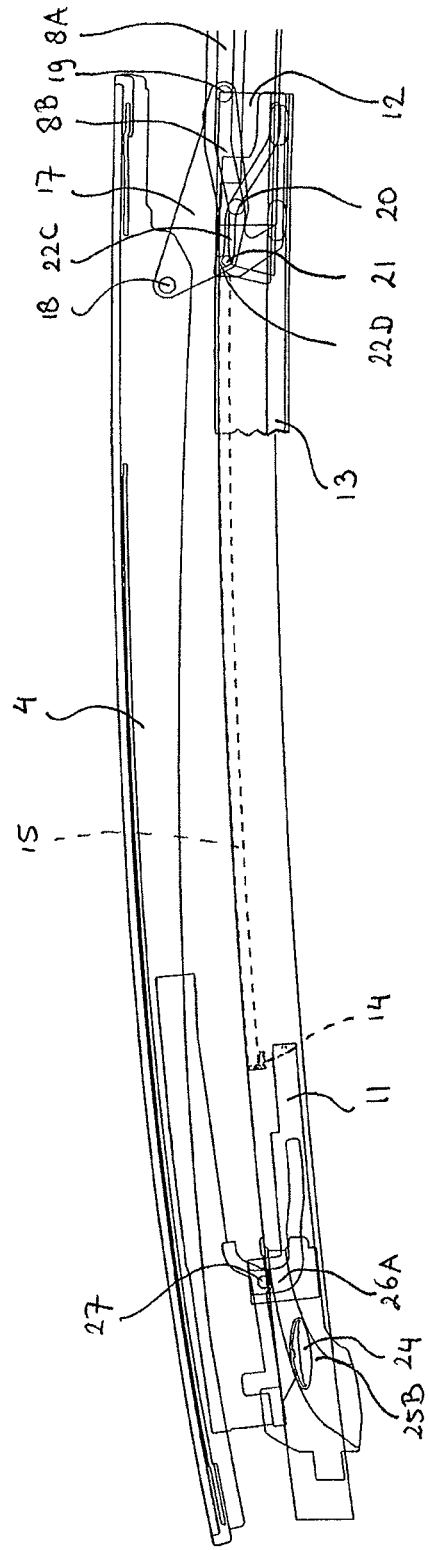

At the rear side of panel 4, guide member 21 has been forced to move through inclined section 22B of guide curve 22 in guiding slide 12. The guiding slide 12 has been displaced by driving slide 11 through coupling element 14 and transmission element 15, while panel 4 and thus rotatable element 17 is kept substantially stationary in longitudinal direction. Due to the upward movement of the guide member 21 through inclined section 22B, rotatable element 17 is forced to rotate about first support member 19, and thus the rear side of panel 4 is lifted by the pivot pin 18 at the front end of rotatable element 17. The rotatable element 17 thus acts as a lifting device for panel 4. In the position of FIG. 4B, 5B, second support member 20 has arrived at the front end of section 8C of rear guide track 8 where it takes over the supporting function from guide member 21. In FIG. 4B, 4C it is engaged with the upper wall of rear longitudinal guide track 8 and will enter section 8C of guide track 8.

In FIG. 4C, 5C, driving slide 11 has been slid rearwardly to such an extent that front slide shoe 24 has arrived at transition section 25B between main rear section 25A and front section 25C of the front curve 25, and front engagement member 27 has arrived in upward front section 26A of front guide curve 26 in driving slide 11. The front engagement member 27 is now locked in this front section 26A so that panel 4 is forced to follow a further rearward displacement of driving slide 11, and this is allowed by the front curve 25, as slide shoe 24 can move through intermediate section 25B in rearward and slightly upward direction.

At rear support 10 guiding slide 12 has been moved further rearwardly by driving slide 11. The guide member 21 of rotatable element 17 has arrived at the front end of front section 22C and bottom end of outlet section 22D of guide curve 22. The panel 4 is now almost in its upward tilting position. The second support member 20 has entered longitudinal front section 8C and is now at the start of inclined section 8B. The support member 20 has now obtained a supporting function and will effect the last tilting movement of panel 4 in this embodiment. It is thus in the transfer from being a guiding device to a supporting device.

Figure 5D:
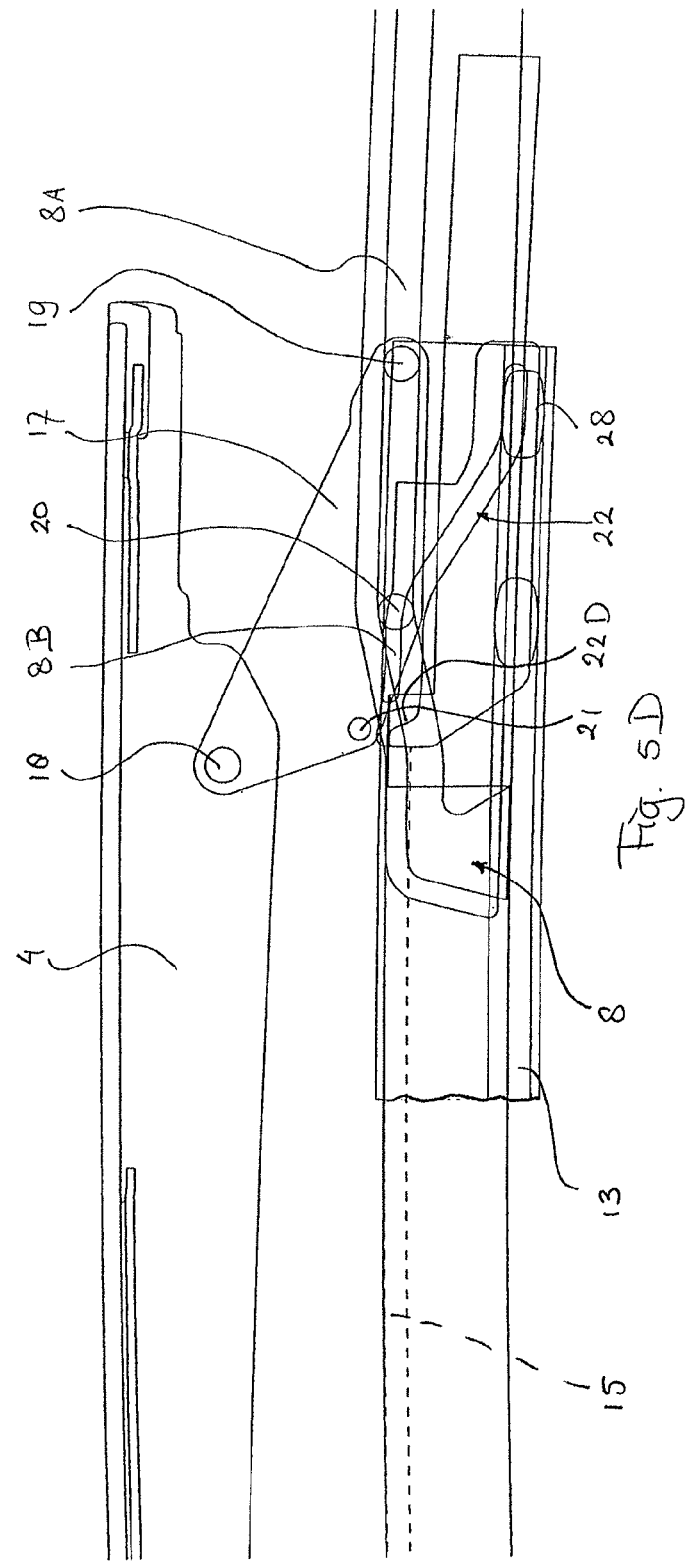
Figure 7A:
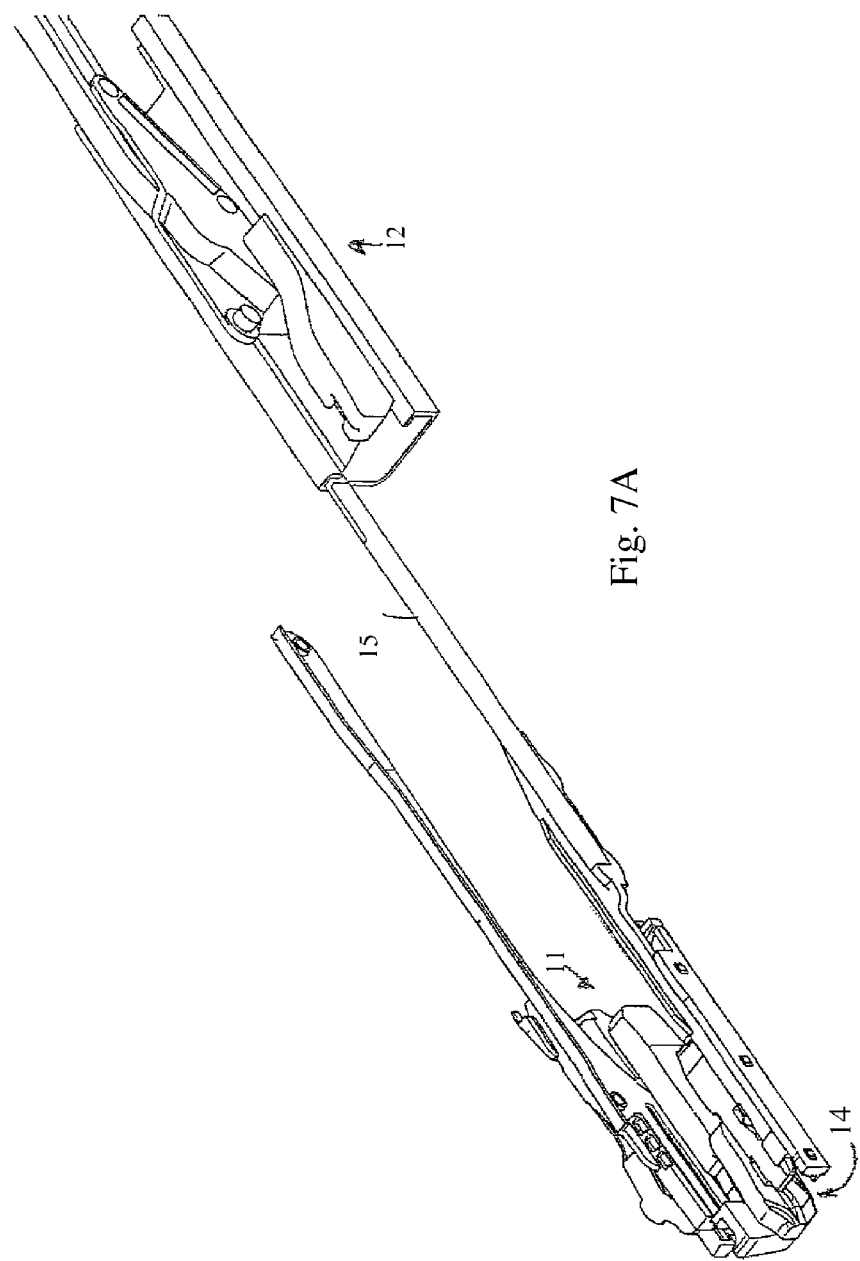
FIGS. 7A-7C are perspective views corresponding to the views of FIGS. 6A-6C, respectively.
Figure 7B:
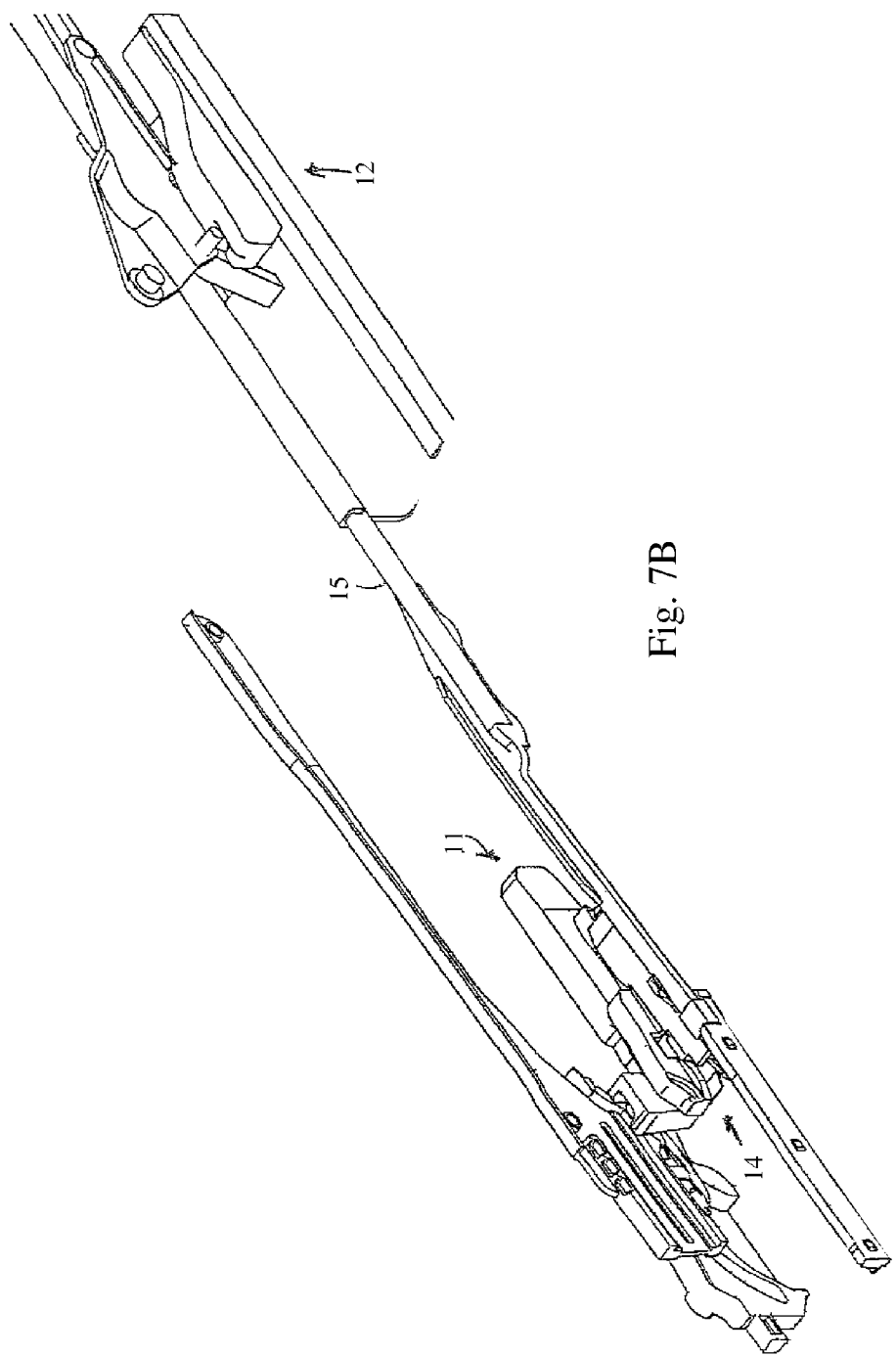
Figure 7C:
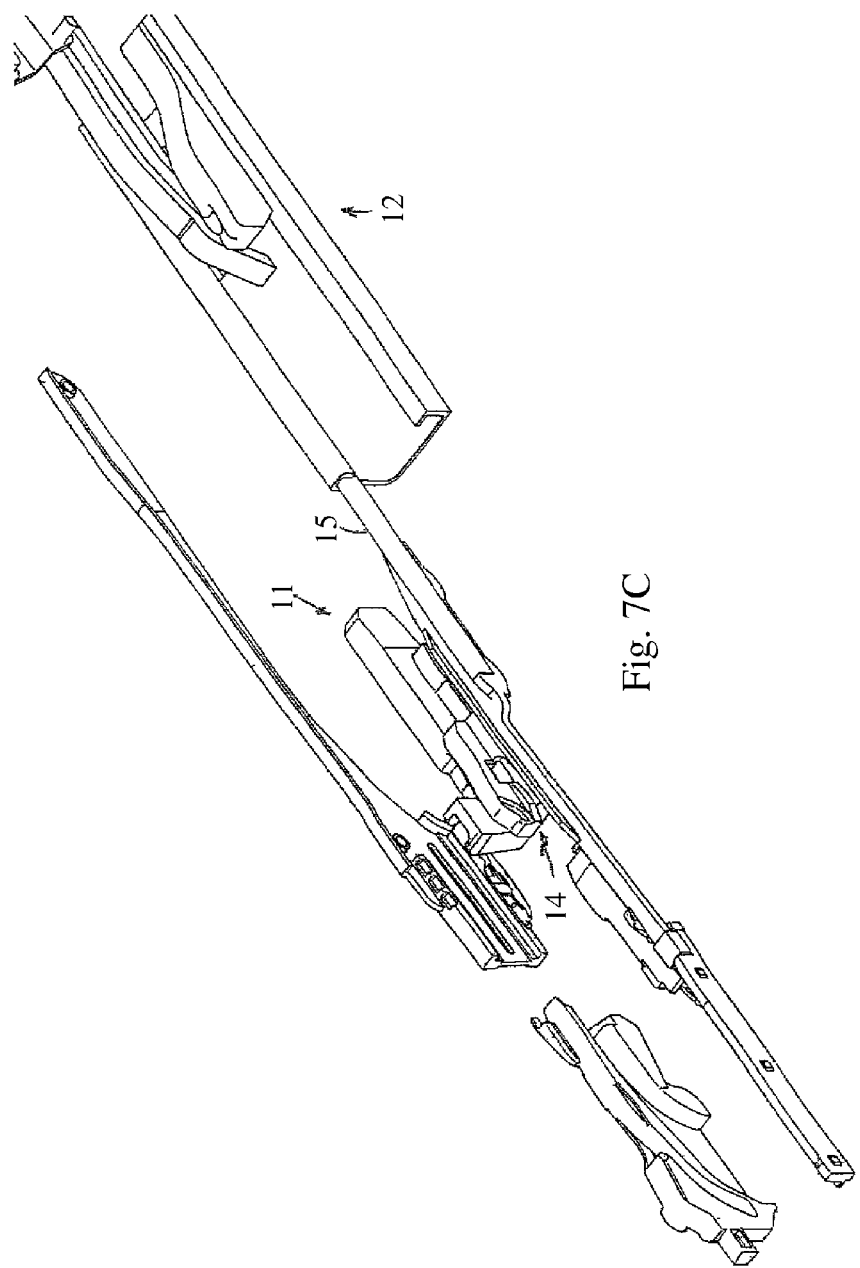

In FIGS. 4D and 5D, driving slide 11 has been moved further rearwardly up to a point where front slide shoe 24 has arrived in rear section 25A of front curve 25. The rear section 25A extends substantially parallel to front longitudinal guide track 7, so that the front of panel 4 will remain at the same height with respect to fixed roof 2 upon further rearward movement of driving slide 11, although the rear section 25A may have other shapes to effect a desired movement of front slide shoe 24 and panel 4. In this position, coupling element 14 has been substantially disconnected from transmission element 15 and therefore driving slide 11 and the guiding slide 12 have been substantially disconnected. A locking element (not shown) of coupling element 14 locks transmission element 15 and therefore guiding slide 12 with respect to the stationary part, in this case front guide track 7. Because panel 4 has moved further rearwardly due to rearward displacement of driving slide 11 taking along front engagement member 27 of panel 4 locked in vertical section 26A of front guide curve 26, second support member 20 has moved through inclined section 8B of rear guide track 8, thereby rotating rotatable element 17 and lifting guide member 21 out of guide curve 22. The guiding slide 12 has followed this rearward movement due to the last travel of coupling element 14, so that guide member 21 and guiding slide 12 have hardly moved with respect to each other in longitudinal direction, only in vertical direction. This vertical displacement is used to allow guide member 21 to leave outlet section 22D of guide curve 22, so that it is positioned above guiding slide 12 and is able to move rearwardly with respect to guiding slide 12.

Figure 4E:
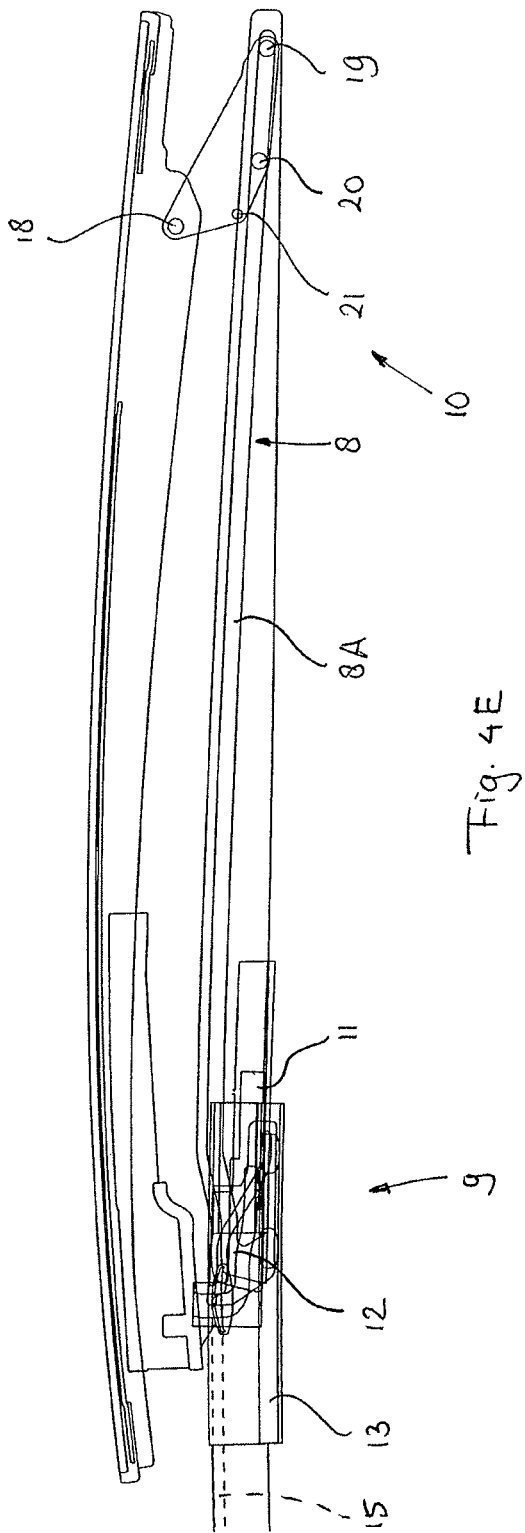

In FIG. 4E, panel 4 is shown in its maximally rearwardly displaced position, as front support 9 is at the rear end of front longitudinal guide track 7, which is near the rear end of intermediate guide track 13. The rotating element 17 is supported by its two support members 19, 20 in rear guide track 8, so that it is locked against rotation and acts as guiding device for panel 4 during its sliding movements. The front support 9 is also locked in vertical direction with respect to front guide track 7 and front guide curve 26 due to the engagement of front slide shoe 24 and front curve 25.

FIGS. 6A, 6b and 6C (which also correspond to FIGS. 7A, 7B and 7C) illustrate movement of the driving slide 11 from a closed position of the panel, to an inclined position of the panel and to a partially rearward position of the panel, respectively.

The return movement of the panel 4 to the front, closed position will be effected in an opposite manner.

From the foregoing it will be clear that aspects of the invention provides a very simple, robust and reliable support and actuating mechanism for the closure element. It has a small package height, while the panel can still be lifted to a sufficient extent.

Aspects of the invention are restricted to the exemplary embodiment as described above and shown in the drawing, which can be varied in several ways without departing from the scope of the claims. For example, it is possible that the height-adjustable, movable element makes a sliding movement in vertical height, or a combined sliding and rotating movement. The positions of the members/pins on the movable element can be varied depending on the desired moving mechanics, force distribution, package height etc. The coupling/locking element for coupling/uncoupling the driving and guiding slides may be separate elements, for example the coupling element on the driving slide and the locking element on the guiding slide. The intermediate longitudinal guide track and the rear longitudinal guide track could be separate or be integrated.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle having an opening in its fixed roof, comprising:
    a stationary part configured to attach to the vehicle roof and having at least one front longitudinal guide track and a rear longitudinal guide track configured to be disposed behind the roof opening;
    a closure element is movably supported by said stationary part;
    a driving unit including a driving slide coupled to said closure element and configured to move the closure element between a closed position for closing the roof opening, and an open, rearward position being at least partially above a roof area behind the roof opening;
    a front support coupled to the closure element and movably guided by said front longitudinal guide track; and
    a rear support coupled to the closure element including a lifting device and a guiding device for engagement in said rear longitudinal guide track upon rearward movement of the closure element, the lifting device and the guiding device being integrated as a height-adjustable movable element which has a forcing mechanism determining whether the movable element acts either as the lifting device or the guiding device, the forcing mechanism including a guiding slide having a guide curve to be engaged by a guide member connected to the movable element, wherein the movable element is adjustable in a vertical direction with respect to the rear longitudinal guide track when the movable element is active as the lifting device, the guide curve of the guiding slide being at least partly inclined with vertical and longitudinal components so as to move the movable element in vertical direction upon a relative longitudinal movement between the guiding slide and the movable element during which the guide member of the movable element is moved along the guide curve.

2. The open roof construction according to claim 1, wherein the movable element is a rotatable element which substantially rotates when functioning as the lifting device and substantially slides when acting as the guiding device, the forcing mechanism determining the transition between both movements.

3. The open roof construction according to claim 1, wherein the guide curve in the guiding slide has an open end to enable the guide member of the movable element to leave the guide curve to enable the movable element to act as the guiding device.

4. The open roof construction according to claim 3, wherein the open end of the guide curve is at a front end thereof, so that the guiding slide moves rearwardly to move the closure element from the closed position to the open, rearward position.

5. The open roof construction according to claim 4, wherein the guiding slide is substantially stationary when the movable element acts as a guiding device, the closure element being moved by the driving slide through the front support when the movable element acts as the guiding device.

6. The open roof construction according to claim 1, wherein the front support is connected to the closure element such that the front support keeps the closure element substantially stationary in longitudinal direction of the guide tracks when the movable element acts as the lifting device so as to enable the guiding slide to move relative to the movable element.

7. The open roof construction according to claim 5, wherein the driving slide is selectively connectable to the guiding slide through a coupling element, the coupling element may also be provided with a locking element locking the guiding slide to the stationary part if the coupling element between the driving slide and the guiding slide is uncoupled to disconnect the driving slide from the guiding slide.

8. The open roof construction according to claim 7, wherein the coupling element in its coupled condition engages an elongated transmission element capable of transmitting compressive forces.

9. The open roof construction according to claim 1, wherein the movable element has a first support member continuously in engagement with the rear longitudinal guide track, and a second support member which is in engagement with and supported by the rear longitudinal guide track when the movable element acts as the guiding device and is unsupported with respect to the rear longitudinal guide track when the movable element acts as the lifting device.

10. The open roof construction according to claim 2, wherein the rotatable element is permanently connected to the closure element through a pivot pin allowing at least a rotation of the rotatable element with respect to the closure element.

11. The open roof construction according to claim 1, wherein the front longitudinal guide track and the rear longitudinal guide track are separated from each other by a barrier carrying a seal engaged by the closure element in its closed position, the driving slide being guided in the front longitudinal guide track and the guiding slide being guided in an intermediate longitudinal guide track positioned near the front end of the rear longitudinal guide track, the driving slide and the guiding slide being connected to each other through a transmission element guided through the barrier.

12. The open roof construction according to claim 10, wherein the movable element has a first support member continuously in engagement with the rear longitudinal guide track, and a second support member which is in engagement with and supported by the rear longitudinal guide track when the movable element acts as the guiding device and is unsupported with respect to the rear longitudinal guide track when the movable element acts as the lifting device, and wherein the pivot pin and first and second support members are positioned at the corners of a triangle.

13. The open roof construction according to claim 10, wherein the movable element has a first support member continuously in engagement with the rear longitudinal guide track, and a second support member which is in engagement with and supported by the rear longitudinal guide track when the movable element acts as the guiding device and is unsupported with respect to the rear longitudinal guide track when the movable element acts as the lifting device, and wherein the guide member is positioned closer to the second support member than to the pivot pin or first support member.

14. The open roof construction according to claim 1, wherein the front support is in engagement with a front guide curve provided on the driving slide guided in the front longitudinal guide track, and is also in engagement with a stationary front curve, said front curve extending at least partly in vertical direction, and said stationary front curve having a front section angled with respect to the front longitudinal guide track and a rear section extending substantially parallel to the front longitudinal guide track.

15. The open roof construction according to claim 1, wherein the front longitudinal guide track and the rear longitudinal guide track are separated from each other, wherein the movable element has a first support member continuously in engagement with the rear longitudinal guide track, the movable element being permanently connected to the closure element through a pivot pin allowing at least a rotation of the movable element with respect to the closure element, the pivot pin being positioned more to the front of the open roof construction than the first support member.

16. A vehicle comprising:
a fixed roof having a roof opening; and
a stationary part configured to attach to the fixed roof and having at least one front longitudinal guide track and a rear longitudinal guide track configured to be disposed behind the roof opening;
a closure element is movably supported by said stationary part;
a driving unit including a driving slide coupled to said closure element and configured to move the closure element between a closed position for closing the roof opening, and an open, rearward position being at least partially above a roof area behind the roof opening;
a front support coupled to the closure element and movably guided by said front longitudinal guide track; and
a rear support coupled to the closure element including a lifting device and a guiding device for engagement in said rear longitudinal guide track upon rearward movement of the closure element, the lifting device and the guiding device being integrated as a height-adjustable movable element which has a forcing mechanism determining whether the movable element acts either as the lifting device or the guiding device, the forcing mechanism including a guiding slide having a guide curve to be engaged by a guide member connected to the movable element, wherein the movable element is adjustable in a vertical direction with respect to the rear longitudinal guide track when the movable element is active as the lifting device, the guide curve of the guiding slide being at least partly inclined with vertical and longitudinal components so as to move the movable element in vertical direction upon a relative longitudinal movement between the guiding slide and the movable element during which the guide member of the movable element is moved along the guide curve.

* * * * *